United States Patent

[11] 3,532,200

| [72] | Inventor | Howard E. Chana<br>Flint, Michigan |
|---|---|---|
| [21] | Appl. No. | 734,757 |
| [22] | Filed | June 5, 1968 |
| [45] | Patented | Oct. 6, 1970 |
| [73] | Assignee | General Motors Corporation<br>Detroit, Michigan<br>a corporation of Delaware<br>Original application June 18, 1964, Ser.<br>No. 376,111, now Patent No. 3,401,581.<br>Divided and this application June 5, 1968,<br>Ser. No. 734,757 |

[54] FRICTION DRIVE WITH AUTOMATIC PRESSURE MODULATING VALVE
3 Claims, 10 Drawing Figs.

[52] U.S. Cl. .................................................. 192/109,
192/.075, 137/488
[51] Int. Cl. .................................................. F16d 25/00
[50] Field of Search .......................................... 192/.034,
.075, 109(F), 85, 87, 13, 97, 18

[56] References Cited
UNITED STATES PATENTS

| 2,756,851 | 7/1956 | Collins | 192/85X |
| 2,807,968 | 10/1957 | Forster | 192/109(F)UX |
| 2,939,557 | 6/1960 | Dabich et al. | 192/109(F)UX |
| 3,025,717 | 3/1962 | Christenson | 192/85X |

Primary Examiner—Benjamin W. Wyche, III
Attorneys—A. M. Heiter, E. W. Christen and C. R. White ABSTRACT: The transmission shown has gearing and a fluid motor operating a friction device to establish direct drive. The control system has a fluid supply passage for supplying pressure fluid through a flow limiting or restricting valve and then through a large first restricted passage to a clutch apply passage connected to the direct drive fluid motor. The supply passage is connected in the flow limiting valve to act on the valve element to reduce flow against a spring bias which normally holds the valve open. The clutch apply passage is connected through a smaller second restricted passage to a control chamber to act on the flow restricting valve to decrease the restriction and the pressure rise in this chamber is delayed and limited by an accumulator controlled by a spring having a high rate and a torque demand pressure.

INVENTOR.
Howard E. Chana
BY
ATTORNEY

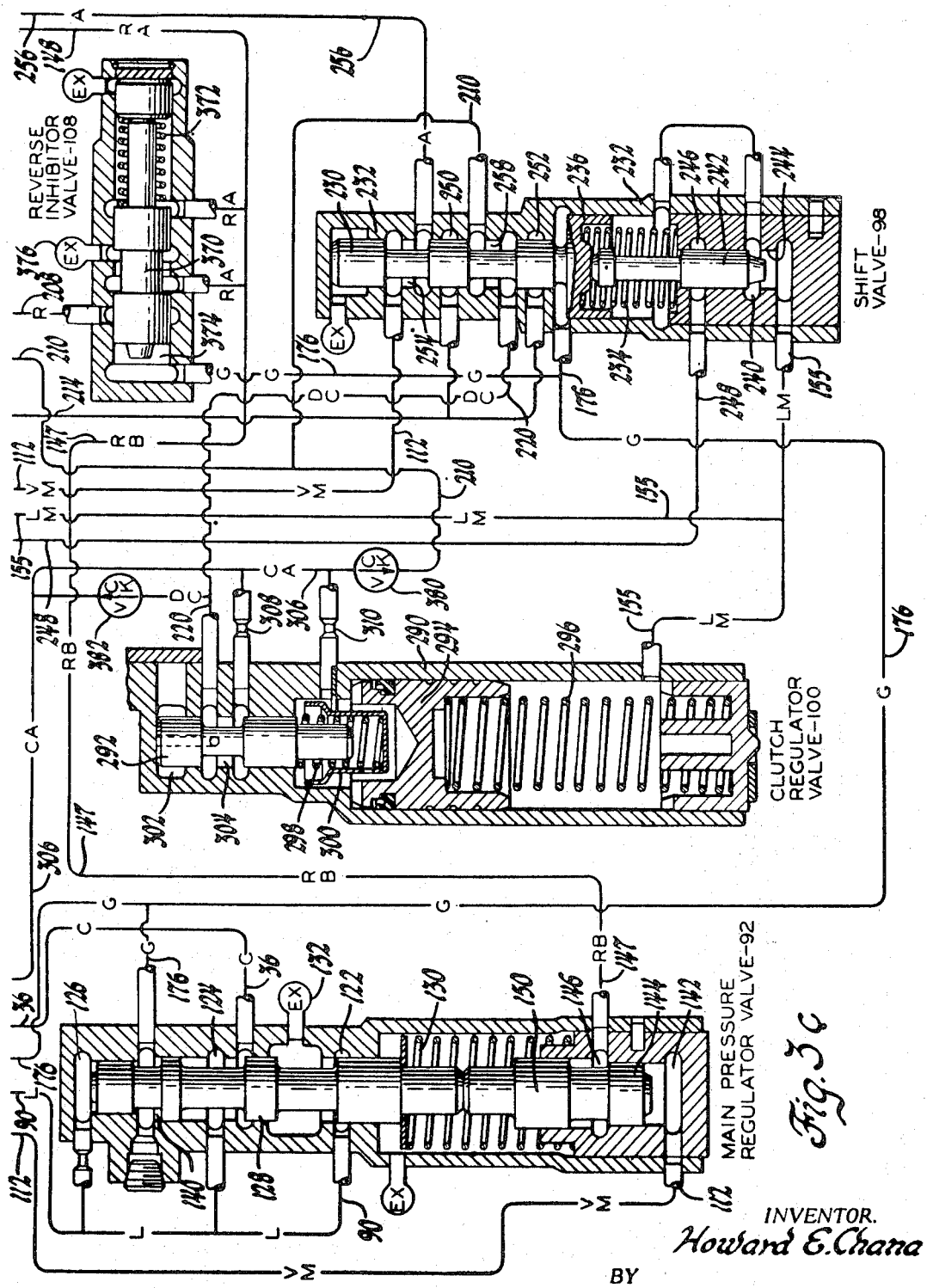

FRICTION DRIVE WITH AUTOMATIC PRESSURE MODULATING VALVE

This invention relates to automatic transmissions and controls therefore suitable for motor vehicles and is a division of the applicant's Ser. No. 376,111 filed June 18, 1964 and now U.S. Pat. No. 3,401,581. It is particularly adapted but not necessarily limited to transmissions of the type having a hydrodynamic torque converter driving planetary change speed gearing which drives the propeller shaft of the car.

Kelley's U.S. Pat. No. 2,818,708 shows one general arrangement of such transmissions. The torque converter itself advantageously may be of the general type shown in the Kelley Pat. No. 2,999,400. In transmissions of the 2,818,708 type, it has been proposed to change the speed ratio of the gearing automatically in response jointly to torque demand on the engine as measured by throttle opening and to the speed of the vehicle, for example as shown in the Kelley Pat. No. 2,865,227. The disclosures of these patents are incorporated herein by reference.

In torque converters of the types described in 2,999,400 there is a reaction member, called a stator, having adjustable blades, the positions of which may be varied to change the range of torque multiplication of the converter. It is usual, whenever the torque demand on the engine is low, to have the blades at a low angle which effects a small change of direction of the oil between the turbine and the impeller and thus produces low range of torque multiplication. And it is usual, whenever the torque demand on the engine is high to increase the angle of the stator blades to redirect the oil through a large angle and thus effect a higher range of torque multiplication. This change in the blade position is usually done automatically to respond to the position of the throttle of the engine. For example during ordinary driving the reaction blades are held at low angle providing relatively low torque multiplication but are moved to high angle providing high multiplication whenever the throttle is opened wide. This is sometimes referred to as providing a passing gear.

In transmissions having gearing driven by a torque converter, it is a practice to control the overall torque multiplication of the transmission by selection of speed ratio in the gearing. For example in the U.S. Pat. Nos. 2,818,708 and 2,865,227 the torque converter may drive the output shaft either direct or through a low speed ratio planetary gearing to provide another form of passing gear, which is in addition to that provided by the adjustable reaction vanes. The change between direct drive and low speed drive may be effected in various ways in response jointly to the speed of the vehicle and to the throttle opening of the engine, for example as in U.S. Pat. No. 2,865,227.

Although the previously proposed methods of changing the speed ratio of the gearing operate satisfactorily within their inherent limitations, they have various disadvantages, including complexity and high cost, which are reduced or eliminated by the present invention.

In the U.S. Pat. Nos. 2,818,708 and 2,865,227 low speed drive is effected by holding one reaction member of the planetary gear set by one form of torque establishing device, namely a band brake. Direct drive in the gearing is effected by releasing the band brake and engaging another form of torque establishing device, namely a direct drive clutch. It has long been a problem with this type of gearing to provide satisfactory release and engagement of the torque establishing devices automatically under all circumstances of driving. It is well known that the requirements of timing the release and engagement of the torque establishing devices, and the rate of building up of the pressure to hold them are quite different for shifting up and shifting down, are quite different at low car speed and high speed, and are quite different at low throttle opening or high throttle opening.

An object of the invention is to provide improved and simplified means for automatically controlling the timing of the shifts and the establishment and release of drive torque to provide smooth, unobjectionable shifts in all driving conditions.

More specifically it is an object of the invention to provide improved means for controlling the rate of engagement of a torque-establishing device with the torque demand upon the engine, especially by providing a timing device the response of which is automatically adjusted to the torque demand on the engine.

Likewise it is an object to provide improved and simple means for controlling the rate of engagement of a torque-establishing device both according to torque demand on the engine and to the speed of the vehicle. More specifically it is an object to provide an accumulator connected to the brake apply cylinder for delaying the build-up of brake-apply pressure, and to provide improved means responsive both to torque demand and vehicle speed for controlling the response of the accumulator.

Another object is to provide means independent of the accumulator and responsive to speed and/or torque demand for increasing the rate of engagement of a torque-establishing device.

Other objects and advantages of the invention will be apparent from the following description and accompanying drawings, in which each particular reference character always designates the same part, wherever it occurs.

In the drawings:

FIG. 2a is a diagram of the way in which

FIG. 2b is a table of conduit legends applied in FIGS. 3a, 3b and 3c.

Before describing the invention in detail it is to be understood that this disclosure is illustrative only and does not constitute any limitation of the invention.

Figure 1:
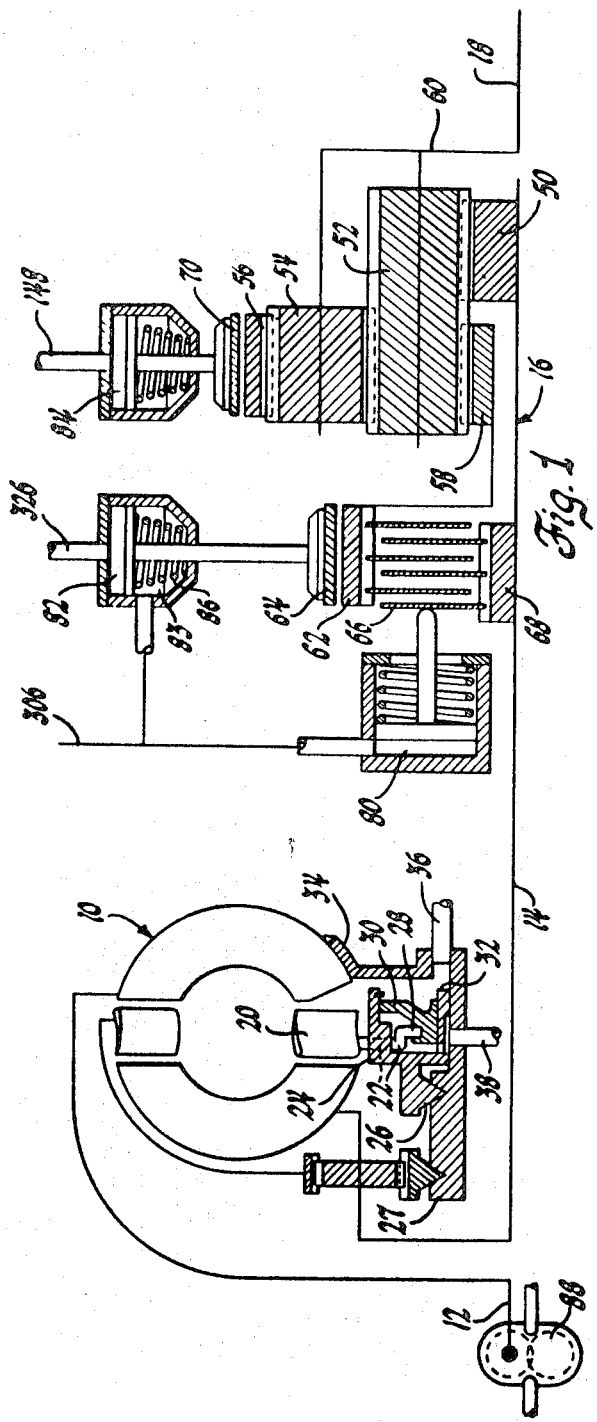
FIG. 1 is a schematic showing of the principal mechanical parts of a transmission embodying one form of the invention.
Figure 2:
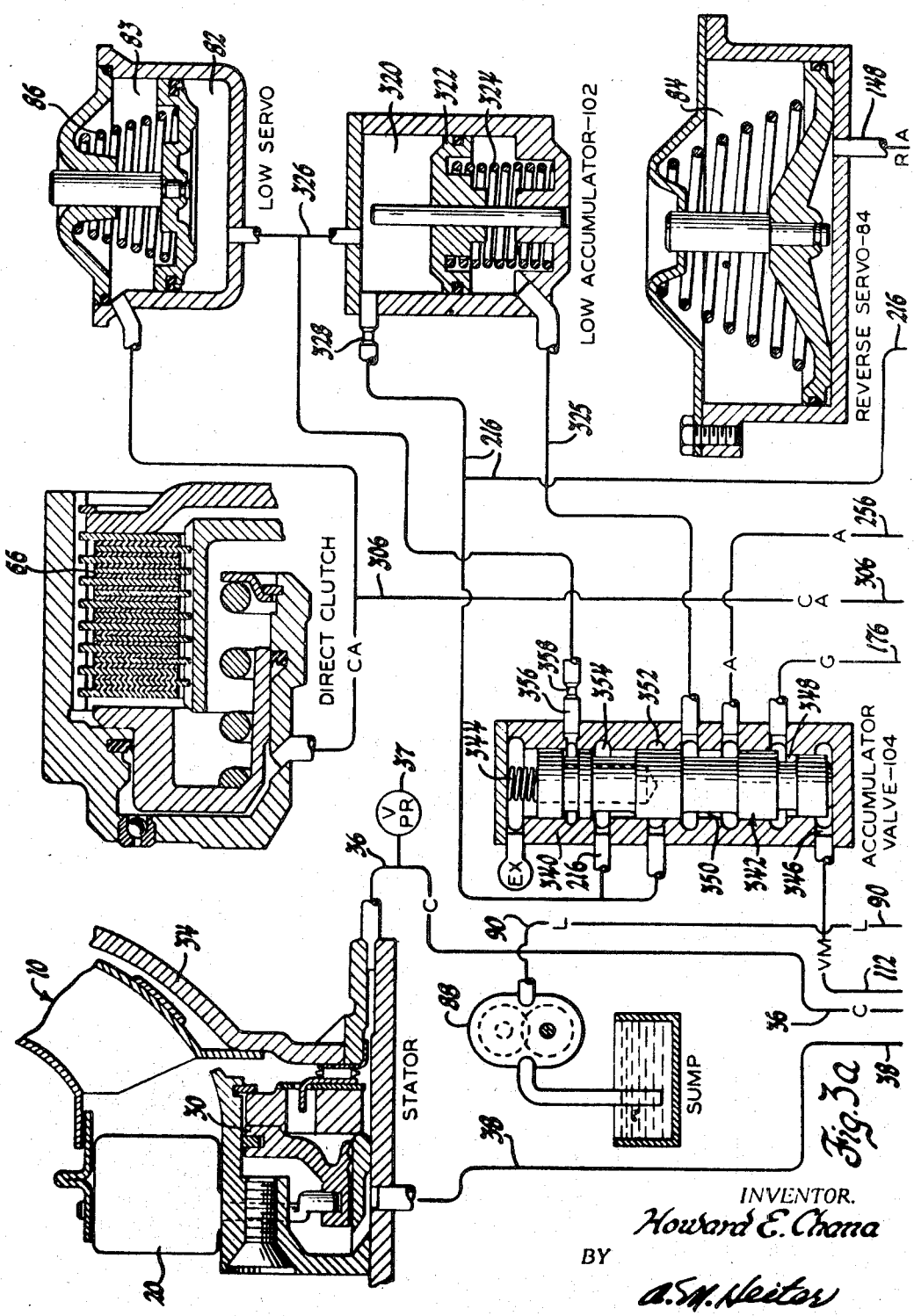

Referring to the drawings, the invention may include a hydro-dynamic torque converter 10 driven by an engine shaft 12 and driving a converter output shaft 14 which is the input shaft of a planetary change speed gear set 16 which drives an output shaft 18, which may be the propeller shaft of the car. The torque converter may be made as more fully disclosed in the patent to Kelley 2,999,400. A stator has reaction blades 20 fixed to shafts 22 pivoted in a ring 24 which can rotate forward about the shaft 14, but is prevented from rotating backward by a one way brake. In the symbolic representation in FIG. 1, the point 26, which is fixed to the ring 24, represents a ratchet pawl which can move forward or toward the observer out of the plane of the paper, but cannot move backward because it is blocked by an abutment 27 grounded or fixed to the frame of the transmission.

Each blade shaft 22 terminates in a crank 28 disposed in an annular groove in an annular piston 30 slidable in an annular cylinder 32 formed in the ring 24. The torque converter is enclosed in a casing 34 in which oil is maintained at a desired constant pressure by a converter supply line 36 any suitable relief valve (not shown) as is known. The pressure of oil in the casing acting on the right side of the piston 30 constantly urges the piston to the left and tends to hold the blades 20 at high angle providing a high range of torque multiplication as is known. The blades may be held at low angle against the force of converter pressure by oil at higher pressure on the left side of the piston 30 when admitted by a low-angle holding line 38 as is known.

The gearset 16 may be made as disclosed more fully in U.S. Pat. No. 2,818,708. In general the gearing input shaft 14 drives an input sun gear 50 meshing with a plurality of long planet gears 52 each of which in turn meshes with a short planet gear 54 which meshes with a reverse reaction ring gear 56. All of the long planets also mesh with a low-speed reaction sun gear 58. All of the planet gears are mounted on spindles on a carrier 60 which drives the transmission output shaft 18 whenever any of the torque-establishing devices of the gear set is engaged. The reaction sun gear 58, is freely rotatable about the shaft 14 and is connected to a brake drum 62, which with brake band 64 constitutes a torque establishing device to drive the output shaft 18 forward at reduced speed. The brake drum 62 also carries one set of plates of a direct drive torque establishing device, namely clutch 66, the other set of which plates is splined to a clutch hub 68 keyed to the input shaft 14. When the brake 64 is released and the clutch 66 is engaged the planetary gear set is locked up and the output shaft is driven at the same speed as the input shaft. In order to drive the output shaft 18 backward a reverse torque-establishing device including a brake band 70 holds the ring gear 56 stationary while the clutch 66 and brake 64 are released.

The individual parts of the transmission as so far described are known, and their particular form is a matter of choice, except that in some embodiments of the present invention, it is desirable to include some form of torque converter having means for changing its range of torque ratio.

The control system for operating the transmission may include a fluid pressure cylinder, motor or servo 80 for engaging the direct drive clutch 66, a fluid pressure cylinder, motor or servo 82 for engaging the low brake band, an opposing cylinder 83 for releasing the low brake band, and a pressure cylinder or servo 84 for engaging the reverse brake band 70. Whenever the gearing is driving forward at either speed ratio the low apply cylinder is pressurized. The clutch cylinder 80 and low brake release cylinder 83 are connected together so that whenever the clutch is applied to effect direct drive the release cylinder 83 is pressurized to balance the force in apply cylinder 82 and permit the spring 86 to release the low speed brake.

Figure 3:
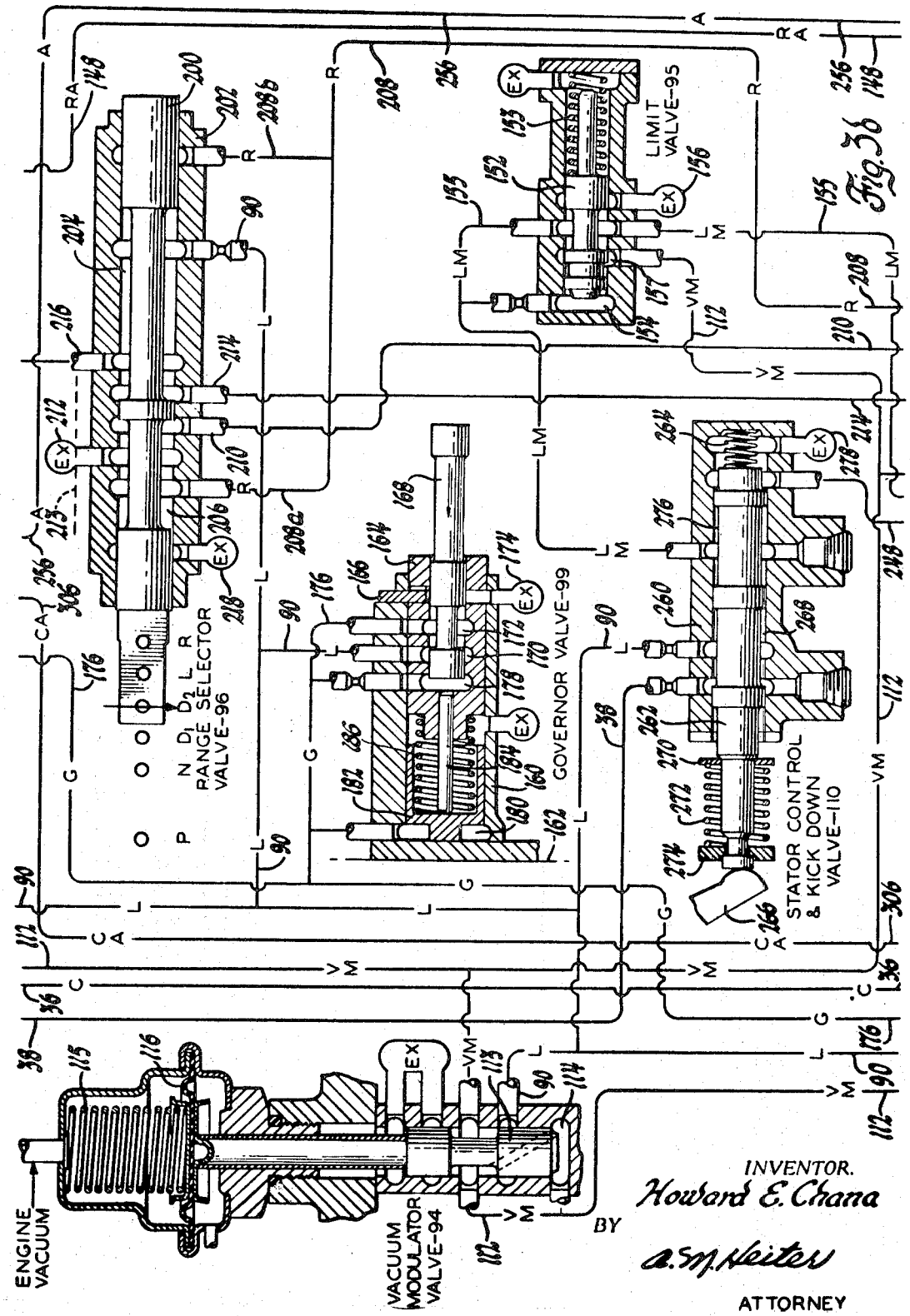
FIGS. 3a, 3b and 3c are to be arranged to make a complete lay-out of one form of hydraulic control system, showing the transmission in low speed forward drive in the automatic range.

As shown in FIGS. 3a, 3b and 3c, the control system includes a pump 88 driven by the input shaft 12 which supplies pressure to a main line 90 whenever the engine is running for actuating the servos and operating the various controls. The controls include a main pressure regulator valve 92 (shown at the left of FIG. 3c) which tends to maintain a constant pump pressure, which pressure however is reduced with increasing car speed by a governor valve 99 (center of FIG. 3b) and is increased with increasing torque demand on the engine by any suitable torque demand sensing device such as a vacuum modulator 94 (left of FIG. 3b) of known form, which supplies a control pressure which increases with increasing throttle opening. This control pressure may be too high, in some circumstances, for properly operating certain control devices. Consequently a limit valve or trimmer valve 95 (shown at the right of FIG. 3b) is used to prevent increase beyond a predetermined pressure (for example 80 percent of full line pressure) in the oil supplied to certain of the controls from the vacuum modulator 94.

Oil pressure is supplied selectively to the various actuators by a manually operated range selector valve 96 (top of FIG. 3b) to provide forward drive at high speed only, forward drive at low speed only, reverse drive, or forward drive at either high speed or low speed as determined by a shift valve 98 (right of FIG. 3c) controlled jointly by the vacuum modulator valve 94 and by the governor 99 which supplies a control pressure measured by car speed. Whenever the direct drive clutch 66 is to be engaged, the timing of the establishment of the required torque by the building up of clutch pressure is controlled by a clutch regulator valve 100 (FIG. 3c). Whenever the low brake is to be applied the timing of torque establishment by the rate of buildup of the low brake apply pressure is controlled by an accumulator 102 (FIG. 3a) and an accumulator valve 104, as will be explained.

A reverse inhibitor valve 108 (FIG. 3c) controlled by governor pressure prevents setting of the reverse brake 70 whenever the forward speed of the car is above predetermined low value, such as 5 miles per hour.

The position of the stator blades 22 is controlled by a stator control valve 110 (FIG. 3b) actuated in response to the position of the engine throttle. The valve 110 includes a detent or kick-down valve for forcing the shift valve 98 (FIG. 3c) to change to low gear.

When the transmission is operating in automatic drive, on starting, the low servo is applied to establish low speed drive. The transmission tends to shift to direct drive with increase of car speed and this tendency is opposed by torque demand on the engine as indicated by throttle position. At desired combinations of car speed and throttle position the transmission shifts into direct drive and continues in direct drive until either the car speed drops below a predetermined value or the torque demand increases beyond a predetermined value at which time the transmission is shifted into low gear.

THE TORQUE DEMAND VALVE 94 (FIG. 3b)

The vacuum modulator valve 94 is an illustrative known form of device. This is constantly supplied with oil from the main line 90 and delivers to control line 112 a control pressure which is measured by torque demand on the engine, as evidenced by the vacuum in the intake manifold which in turn is influenced by throttle opening. A valve spool 113, depending on its position, closes entry from the main line 90 to the vacuum modulator line 112 and opens a vent port EX to vent excess pressure from the vacuum modulator line, or alternatively closes the vent port to admit pressure from the main line 90 to the vacuum modulator line 112.

The position of the spool is determined jointly by the regulated pressure in the vacuum modulator line sensed in a pressure regulating chamber 114 beneath the spool (connected to the vacuum modulator line 112) and by a spring 115 which urges downward a diaphragm 116 urged upward by the difference between atmospheric pressure and engine intake manifold pressure.

MAIN PRESSURE REGULATOR VALVE 92 (FIG. 3c)

The main line 90 is connected to the main pressure regulator valve 92 at a pressure regulating port 122, at a converter supply port 124, and through a suitable restriction to a pressure regulating chamber 126. A valve stem or spool 128 is constantly urged upward by a spring 130 and is constantly urged downward by the pressure of the main line in pressure regulating chamber 126. This arrangement as so far described is known and tends to maintain in the pump and main line a constant pressure determined by the force of the spring 130, for whenever the pressure in pressure regulating chamber 126 tends to exceed a predetermined value, the valve stem moves down far enough to dump excess pressure to the sump or pump intake through the exhaust port 132.

The otherwise constant pressure maintained by the main pressure regulator valve 92 is decreased in accordance with vehicle speed by a governor chamber 140 supplied with pressure increasing with car speed from governor 99, as will be explained. The governor pressure urges the spool 128 down and so adds its force to the force in the chamber 126 and thus decreases the pressure in chamber 126 at which exhaust port 132 will open. This decreases line pressure as car speed increases, as is known.

The pressure maintained by the main pressure regulator valve is also increased by amounts measured by torque demand on the engine by vacuum modulator pressure delivered by vacuum modulator line 112 to a torque demand boost chamber 142 below a land, plug or piston 144 which urges the regulator valve stem 128 up and so adds its force to that of the spring 130.

Except for the control by vacuum modulator pressure and governor pressure, the main pressure regulator valve 92 is arranged to tend to maintain in forward speed a constant pressure in the main line in the same manner as does the pressure regulating valve 150 in the Kelley Pat. No. 2,818,708 and to increase the value of line pressure in reverse. To accomplish this increase the main regulator valve 92 includes a reverse boost chamber 146 connected by reverse boost line 147 to the reverse apply line 148. Whenever reverse is applied, this exerts reverse brake apply pressure on a land 150 of larger diameter than land 144 to urge the plug upward against the valve stem 128.

VACUUM MODULATOR PRESSURE LIMIT VALVE 95

The limit valve 95 has a bore receiving a spool 152 urged to the left to open the valve by a spring 153 and urged to the right to close the valve by the pressure of oil in a pressure regulating chamber 154 connected to the pressure delivery line 155 through a suitable choke. The pressure delivery line is connected to the bore between an exhaust port 156 and an inlet port 157 connected to the vacuum modulator line 112. Whenever the vacuum modulator pressure is below a predetermined value, the spring holds the valve open and it supplies the varying modulator pressure to the delivery line 155, but whenever the vacuum modulator pressure tends to exceed the predetermined amount, this pressure in the regulating chamber tends to close the inlet port 157 and open the exhaust port 156. This arrangement provides a constant regulated pressure called limited vacuum modulator pressure and measured by the force of the spring, whenever vacuum modulator pressure is above a predetermined value, for example 80 percent of line pressure.

GOVERNOR VALVE 99 (FIG. 3b)

As an example of one form of structure for generating a control pressure which increases with car speed the governor may include a body 160 which has a radial bore in which is disposed a liner 164 locked in place by a retainer 166. The liner has a central bore containing a valve stem 168 which is urged inward or toward the axis 162 by a force represented by the arrow which is a measure of car speed for example by any suitable centrifugal arrangement, for example that shown in FIG. 8 of the Kelley Pat. No. 2,865,227. The casing 160 and the liner 164 are provided with suitable ports into the bore. A governor supply port 170 is connected to main line 90 and admits oil to a regulated pressure chamber 172 from which excess pressure can be vented at an exhaust port 174.

The regulated pressure chamber 172 maintains its pressure in the governor line 176 from which the regulated pressure enters a first pressure regulating chamber 178 through a suitable choke. When the governor pressure tends to increase beyond a predetermined value at any particular speed of rotation it pushes the stem 168 to the right and bleeds pressure from the governor line, but if the pressure falls below the predetermined value at this speed the centrifugal weight moves the stem to the left closing the exhaust port and admitting pressure from the line. As is known this arrangement tends to maintain a governor pressure measured by speed. This provides one stage or range of governor pressure which may increase by a given proportionate factor with the square of the speed, for example.

The governor includes structure for providing a second stage during which the governor pressure may increase with the square of the speed by a different proportion. The governor pressure is supplied to a second pressure regulating chamber 180 which urges to the right a spring cup or piston 182 carrying a pin 184. The piston 182 is of larger diameter than the valve spool on stem 168. Whenever the pressure in the governor line reaches a predetermined amount, the force in the chamber 180 pushes the cup 182 to the right against the force of the spring 186 so that the pin 186 presses against the valve stem 168 and adds the force of the second pressure regulating chamber to the force of the first pressure regulating chamber. Due to the larger diameter of the piston 182, the governor pressure will increase with car speed more slowly in the second stage than in the first, because at a given speed the chamber 182 exerts a much greater force than chamber 178 tending to open exhaust port 174. Consequently at a given car speed the exhaust port will open at a much lower instantaneous pressure than it would without the large piston.

The governor pressure line 176 is connected to the governor chamber 140 of main pressure regulator valve 92 to decrease line pressure as car speed increases; to the shift valve 98 to tend to up-shift the valve; to the accumulator valve 104 to control rate of build-up of low brake apply pressure according to car speed; and to the reverse inhibitor valve 108 to prevent establishing reverse in the gearing when the car is moving forward.

RANGE SELECTOR VALVE 96 (FIG. 3b)

The range selector valve 96 can block line pressure from all drive actuators, or can direct line pressure to engage the low brake 64 alone, to engage the direct clutch 66 while disengaging the low brake, or to engage the reverse band 70 alone. It can also direct pressure to a Drive-2 control line 214 which is connected to the shift valve 98 to establish automatic drive, that is, automatic shifting between low forward and direct forward drive in the gearing. This manual or range selector valve includes a valve stem or spool 200 slidable in a bore in a casing 202 and having right and left grooves 204 and 206. In the Drive-2 or $D_2$ automatic drive position shown in FIG. 3b the reverse servo supply line 208 is vented, because it is connected through its left hand branch 208a to the groove 206. The Drive-1 or $D_1$ line 210, which when pressurized, establishes direct drive through the high clutch 66 alone, as will be explained, is vented because it is also connected to the groove 206 which is vented through the vent line 212 which discharges into the sump above the oil level 213. Main line 90 supplies oil to groove 204 which in turn pressurizes the $D_2$ control line 214 and the low servo supply line 216. However the $D_2$ line is now closed at the shift valve 98 in its down-shifted position as shown in FIG. 3c. Consequently oil is supplied only to the low servo through supply line 216 which establishes initial low forward drive subject to the timing control by the accumulator 102 and accumulator valve 104 in the manner explained hereafter. Up-shifting from such initial low to high speed ratio in the gearing will be explained.

If the selector valve spool 200 is moved to the neutral position two notches to the left of the position shown in FIG. 3b, that is with the index at the N mark, the land at the right of groove 204 will block the oil supply from main line 90. Also the land between grooves 204 and 206 will lie between exhaust port 212 and the reverse supply line 208a to vent groove 204. Consequently the low supply line 216, the $D_2$ line 214 and the $D_1$ line 210 will all be vented. The land to the left of groove 206 will uncover an exhaust port 218 to vent the reverse supply line through its left hand branch 208a. Consequently all drive establishing devices will be released.

If the selector valve spool 200 is moved one position to the left of that shown in FIG. 3b, that is with the index opposite the $D_1$ mark, this establishes and maintains high speed forward drive, by engaging the direct drive clutch and preventing engagement of the low speed brake. The land separating grooves 204 and 206 will lie between exhaust port 212 and $D_1$ line 210 so that groove 206 will vent reverse line 208a at vent port 212 and groove 204 will supply oil from main line 90 to the low supply line 216, to the $D_2$ line 214 which is blocked at the shift valve 98, and to the $D_1$ line 210. The $D_1$ line 210 is connected (at the shift valve 98 in its down-shifted position shown in FIG. 3c) to the direct clutch supply line 220 which establishes pressure in the direct clutch cylinder 80 under the timing control of the clutch regulator valve 100, to drive the car in high gear, as will be explained. Although the low servo supply line 216 has been pressurized, it will be recalled that whenever the clutch 66 is energized the servo release chamber 83 is pressurized and releases the low brake. Consequently in this position the range selector valve maintains drive from the converter through the forward high speed clutch alone.

When the selector valve spool 200 is moved one notch to the right of that shown in FIG. 3b namely with the index opposite the L mark, the $D_1$ line 210, the reverse supply line 208 at branch 208a and the $D_2$ control line 214 will all be vented through groove 206 at exhaust port 212 and oil will be supplied from the main line 90 through groove 204 to the low servo supply line 216 alone. After appropriate timing interval, to be explained, this will drive the transmission with the gearing in low speed ratio by setting the low brake band 64.

If the selector valve spool 200 is moved two positions to the right of that shown in FIG. 3b namely with the index opposite the R mark, the low supply line 216, the $D_2$ control line 214, and the $D_1$ line 210 will all be vented through groove 206 at exhaust port 212. The left hand branch 208a of the reverse supply line 208 will be blocked by the land at the left end of the groove 206, but the right hand branch 208b of the reverse supply line 208 will be uncovered by the land at the right of groove 204 and the main line will supply oil to the reverse supply line through groove 204. This will establish reverse drive in the transmission provided the car is not moving forward above a predetermined speed, as will be explained.

SHIFT VALVE 98 (FIG. 3c)

The shift valve 98 has a stepped spool 230 in a stepped bore in a casing 232. The spool is constantly urged up toward its down-shifted position, shown in FIG. 3c for establishing low speed drive by a spring 234 acting on the lower side of a large piston 236 of the spool. The spool is also urged up by oil pressure acting on the lower side of the large piston 236 only in the down-shifted position shown in FIG. 3c. Such oil pressure can be supplied from the limited vacuum modulator supply line 155. The spool is urged downwardly, whenever the car is running, by governor pressure on the upper side of the large piston 236 supplied from the governor valve 99 by the governor pressure line 176. Whenever the force of the governor pressure exceeds the sum of the force of the spring 234 and the force of limited vacuum modulator pressure below the piston 236, the spool 230 is moved down or up-shifted to the position shown in FIG. 4 to establish high speed drive, as will be explained, but otherwise it establishes low speed drive. The limited vacuum modulator pressure is supplied to the underside of the piston 236 by a port 240 at the bottom of the valve, controlled by a piston 242 on the valve stem 230 which piston slides in a chamber 244 pressurized from the limited vacuum modulator line 155. Whenever the governor pressure overcomes the spring 234 and limited vacuum modulator pressure to press the spool down into the up-shifted position, the piston 242 closes the port 240 and opens a port 246 to vent the chamber on the lower side of the piston 236 by connecting this chamber to a detent line 248 which, except at wide open throttle or kick-down, is vented at the stator control valve, as will be explained. This vents the pressure below the piston 236 and thus provides a hydraulic latch to prevent hunting of the valve, that is shifting up and shifting down at about the same car speed. However in order to down-shift when the speed is reduced to a predetermined relationship to torque demand appropriate to a down-shift, the vacuum modulator pressure in the chamber 244 continues to exert a small down-shifting force on the small diameter piston 242 attached to the valve stem 230.

Whenever the range selector valve in $D_2$ position provides automatic drive by pressurizing the $D_2$ control line 214, this line supplies main line pressure to the shift valve at two $D_2$ low ports 250 and 252. Whenever the shift valve spool 230 is up, that is in the down-shifted position depicted in FIG. 3c, both ports 250 and 252 are blocked as by lands on the spool as shown. Also in this position the vacuum modulator line 112 is connected through groove 254 to an accumulator supply or A-line 256 (which supplied the accumulator valve 104, as will be explained) and the vented $D_1$ line 210 is connected through a groove 258 to the direct clutch supply line 220. The direct clutch cannot be engaged. This establishes initial low-speed drive.

Figure 4:
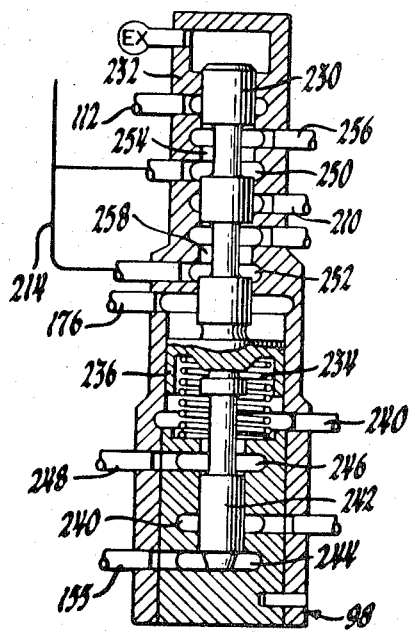
FIG. 4 shows the automatic shift valve of FIG. 3c in its upshifted or high speed position.

Whenever the shift valve is up-shifted, that is moved down by governor pressure opposed by limited vacuum modulator pressure to the position shown in FIG. 4 groove 254 connects the accumulator supply line 256 to line pressure in port 250 as shown and the land above groove 254 blocks the vacuum modulator line 112. Also the $D_1$ line 210 is blocked by the land between grooves 254 and 258 which cuts off communication between the direct clutch supply line 220 and the vent 212 in the range selector valve, and the groove 258 connects line pressure at port 252 with the direct clutch supply line 220. This, after an appropriate timing interval as will be explained, supplies oil to the direct clutch 66 and to the low servo release chamber 83 to establish high speed drive in the gearing.

STATOR CONTROL AND KICK-DOWN VALVE 110 (FIG. 3b)

Figure 5:
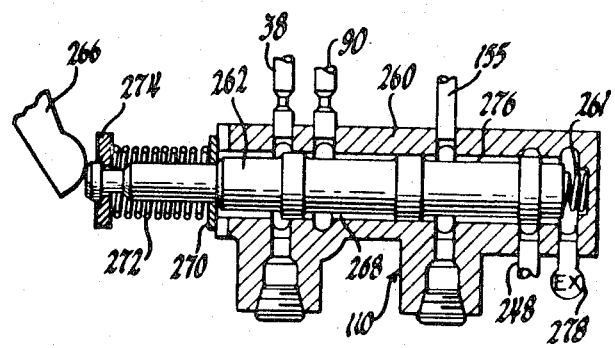
FIG. 5 shows the stator control valve of FIG. 3b moved by relatively high torque demand to the position holding the stator at high angle.

This includes a casing 260 having a bore containing a valve spool 262 constantly urged toward the left by a spring 264 at its right end, and movable to the right against the force of this spring by a rotatable or swing arm 266 connected to the throttle of the engine. The position of the spool 262 in the bore is therefore responsive to the amount of throttle opening, and at low throttle openings the spool is fully to the left as shown in FIG. 3b. In this position groove 268 connects main line 90 to the low-angle stator holding line 38 and supplies oil at main line pressure to the left side of the piston 30 for holding the stator blades at low angle as has been explained. This groove is long enough to supply oil to the line 38 until the throttle is nearly wide open as represented by FIG. 5, in which position the land at the left of the groove 268 closes the connection of main line 90 to the valve 110, and opens the stator control line 38 to the exhaust port formed by the open left end of the bore. This bleeds the stator low angle holding cylinder to the left of piston 30 to allow converter pressure to move the stator blades to high angle as has been explained.

Figure 6:
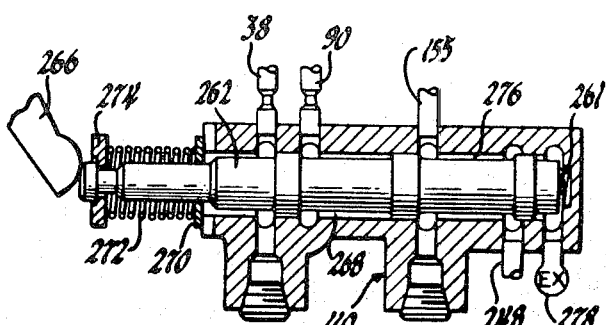
FIG. 6 shows the stator control valve in the kick-down position, that is moved past the position of FIG. 5 by still higher torque demand to force down-shifting in the gearing.

The valve stem 262 also acts as a kick-down valve to change the ratio of the gearing. Whenever the throttle is moved to the stator shift position shown in FIG. 5, a collar 270 engages the left end of the casing 260, but does not block the vent, and a preloaded compression spring 272 bearing against an outer collar 274 around the head of the valve stem resists further movement of the stem to the right. This provides sudden resistance to moving the throttle further open and warns the driver that the kick-down position has been approached. Further opening movement of the throttle arm compresses the spring 272 and moves the valve stem further to the right into the position shown in FIG. 6 in which a groove 276 establishes communication between the limited vacuum modulator line 155 and the detent or kick-down line 248 and closes the vent port 278, to which the detent line 248 had been connected. This conducts limited vacuum modulator pressure to the up-shifted shift valve 98 through open port 248 to the space below the large piston 236 and restores the force of limited vacuum modulator pressure to overcome governor pressure to force the valve to its down-shifted position. This establishes low ratio drive in the gearing.

This arrangement of the stator control valve and kick-down valve for the gearing insures that when moderately high torque is required, the demand is met by increasing the torque-multiplying range of the converter, and thereafter increased torque demand is met by increasing the torque ratio of the gearing. It also assures that in case of sudden maximum torque demand, as manifested by flooring the throttle pedal, the stator is in high torque position when the gearing is down-shifted. However, when car speed reaches a predetermined value, the shift valve 98 will up-shift the gearing, even if the throttle is held wide open. The transmission will continue to operate with the converter in high torque range until the throttle is partly closed.

It is possible without increasing car speed to increase limited vacuum modulator pressure by opening the throttle, or to supply maximum limited vacuum modulator pressure (which may be approximately 80 percent of maximum line pressure). Consequently admission of a higher limited vacuum modulator pressure after up-shift can force down-shift of the valve. The fact that the pressure admitted by the kick-down mechanism is limited modulator pressure prevents a pressure in excess of 80 percent of line pressure being admitted beneath the piston 236 and this automatically establishes a car speed above which it is impossible to kick-down and above which the governor pressure will restore high speed after a kick-down.

CLUTCH REGULATOR VALVE 100 (FIG. 3c)

This valve provides a pressure regulating and timing device for engaging the direct clutch gradually and in accord with torque demand. The valve includes a casing 290 having a stepped bore, in the small diameter of which is a valve stem 292 and in the large end of which is an accumulator piston 294 urged upwardly by a spring 296 and by the force of limited vacuum modulator pressure beneath the piston.

The valve stem 292 is urged upward by a light spring 298 seated in a perforated spring cup 300 fixed in the casing 290. The spring 298 is just sufficient to hold the valve 292 open when the clutch apply line is vented, and to determine the speed of response of the accumulator, as will be explained. The valve stem is urged downward by regulated clutch pressure in a regulating chamber 302 above the valve stem. The regulated clutch pressure is the actual stable pressure in the clutch apply chamber 80, the chamber 302 being in communication with the groove 304 in the valve stem. The spring 298 holds the valve stem 292 up, or open when the clutch supply line 220 is not pressurized. Therefore when the line 220 becomes pressurized, oil flows through a bore in the valve stem to the pressure regulating chamber 302 above the stem 292, and flows through the choke 308 to the clutch apply or CA line 306 and begins to urge the clutch apply piston in the clutch 66 against the force of the customary clutch release spring. Oil also flows through the choke 310 to the space below the stem 292 and through the cup 300 to exert additional opening force on the valve stem.

Initially when the force of pressure in chamber 302 exceeds the force of spring 298, the valve stem 292 moves down to prevent further flow of oil into the clutch apply line 306. But pressure in conduit 306 creates pressure below the valve stem, assisting the spring 298 to hold the valve open. This latter pressure lags below and behind the pressure in line 306 due to the choke 310 which is smaller than choke 308, being about 60 percent of the diameter of the latter. For example choke 308 may be .089 inch in diameter, while choke 310 may have a diameter of .052.

Now, since piston 294 can move down under pressure above it, supplied by choke 310, this latter pressure enters an expanding space, and will be limited in its instantaneous value to the sum of the limited vacuum modulator pressure below the piston plus the pressure value of the force of spring 296 plus the pressure value of the friction between the piston 294 and the cylinder in which it slides. Initially the spring 296 may exert little or no force on the piston beyond that required to hold it at the top of the cylinder. The friction is constant and of negligible value. The pressure below the piston will be the instantaneous value of limited vacuum modulator pressure. Consequently the clutch pressure in line 306 tends to close the valve to prevent increase in clutch pressure and the delayed pressure increase below the valve stem 292 (which equals limited vacuum modulator pressure plus the pressure value of the spring 296) tends to keep the valve open, and this lets pressure build up in the clutch. Pressure build up in the clutch can be delayed as long as the piston 294 is stroking, because as long as it is stroking the instantaneous pressure above piston 294 and on the left side of choke 310 is only slightly above the sum of limited vacuum modulator pressure plus the pressure value of spring 296, and the pressure on the right side of orifice 310 cannot exceed the sum of limited vacuum modulator pressure plus the pressure value of spring 296 plus the pressure value of spring 298. Consequently the pressure drop across orifice 310 is measured by the force exerted by the spring 298, and the clutch pressure, for all practical purposes, equals limited vacuum modulator pressure plus the pressure value of spring 296 and pressure value of spring 298. As the piston strokes, the force of the spring 296 progressively increases and this progressively increases clutch pressure.

The rate at which piston 294 strokes, which thus determines the rate at which clutch pressure increases, is determined by the rate of flow of oil through orifice 310 and this in turn is determined by two constants, the force of spring 298 and the diameter of the orifice. Thus the piston 294 is a constant rate delaying device for determining the rate at which clutch pressure increases, until the piston reaches the bottom of its stroke, when the clutch pressure quickly increases to full pump pressure.

While the piston 294 determines the rate of increase of clutch pressure above some initial value determined by limited vacuum modulator pressure and thus determine the time required to reach full line pressure it does not determine the value of clutch pressure at any particular instant. That is determined by limited vacuum modulator pressure, which is a measure of the torque requirement at any instant. When the piston 294 begins to stroke, the clutch pressure must be approximately equal to (that is slightly higher than) limited vacuum modulator pressure, as explained above. So the time at which the clutch pressure will build up to some absolute value (regardless of what percentage of full line pressure this absolute value is) depends on the value limited vacuum modulator pressure existing when the clutch line is pressurized. Some absolute value of pressure determines when the clutch is fully engaged without slipping at each particular value of torque required to be transmitted. Thus the clutch pressure regulator valve serves both as a timing device to regulate buildup of clutch pressure and as a device to determine engagement pressure according to torque demand.

Since the clutch apply pressure equals the servo release pressure the timing of the increase of clutch pressure also times the increase of servo release pressure and this insures correct relative timing of the release of the low drive torque and the establishment of the direct drive torque. Since these torques must be applied at different speeds and since when shifting up overlap of torque may be required and when shifting down a gap in the applied torque may be required, as is known, this arrangement together with the low accumulator and its control valve provides a very effective means for insuring the correct application of torque under all conditions.

LOW ACCUMULATOR 102 AND ACCUMULATOR CONTROL VALVE 104 (FIG. 3a)

The accumulator for controlling the build-up of brake apply pressure in the low servo 82 includes a cylinder 320 containing a piston 322 urged upward by a spring 324 and by pressure in the chamber beneath the piston which may be supplied by an accumulator feed line 325. The piston is urged downward against the spring and the pressure beneath it by the pressure in the cylinder 320 above the piston. This latter pressure is low brake apply pressure existing in the low servo 82 and in low brake apply line 326. The low brake supply line 216 is connected to the chamber 320 above the piston and to the low brake apply line 326 through a suitable choke 328, so that whenever the low brake supply line 216 is pressurized oil is fed to the low brake apply chamber and the accumulator. The accumulator piston can be pushed down by the brake apply pressure so that the expanding chamber above the piston slows the build-up of brake apply pressure until movement of the piston is stopped, at which time the pressure rises to full line pressure. During this movement the pressure in apply line 326 gradually increases due to increased loading of the spring 324.

Normally the chamber beneath the piston 322 is supplied with oil at vacuum modulator pressure from the accumulator feed line 325 which receives oil through the open accumulator valve, as will be explained, from the accumulator supply line 256 which is pressurized from the vacuum modulator line 112 by the shift valve 98 through its groove 254 whenever the shift valve is in the down-shifted position, shown in FIG. 3c. The pressure below the piston 322 increases the force required to move the piston and this increases the low brake apply pressure.

The accumulator control valve 104 includes a casing 340 having a stepped bore containing a stepped spool 342 urged constantly down by a spring 344 and urged up against the force of the spring by vacuum modulator pressure in a fluid pressure motor formed by chamber 346 at the bottom of the spool and/or by governor pressure in a second fluid pressure motor formed by chamber 348 between relatively large and relatively small lands on the spool. These fluid motors are mechanically connected to the valve independently of each other, by each acting directly on the stem. The spool has a groove 350 which when the valve is fully down as shown in FIG. 3a connects the accumulator supply line 256 with the accumulator feed line 325. The casing 340 also has ports 352 and 354 both connected to the low brake supply line 216, and has a port 356 connected to the brake apply line 326 through a suitable choke 358, which may have a restriction equal to that of choke 328.

When the sum of vacuum modulator pressure and governor pressure is low, that is to say when the car is travelling at low speed or is stopped and the throttle is nearly closed, the valve stem 342 is held down by the spring 344 and the accumulator is connected to the vacuum modulator line 112 to supply vacuum modulator pressure beneath the piston 322 of the accumulator. This connection is by lines 325 and 256 through the shift valve 98 through its groove 254. When the sum of governor pressure and vacuum modulator pressure is above a predetermined amount, that is when the throttle is opened a predetermined amount, or the car is running at a predetermined speed, or if the throttle is opened a somewhat lesser amount and the car is running at a somewhat lower speed, then the valve stem 342 is moved up against the spring. This closes the accumulator supply line 256 at the valve and supplies line pressure to the accumulator below the piston, by connecting the low supply line 216 at port 352 to the accumulator feed line 325. Since the piston is at the top of the accumulator cylinder and since oil at line pressure is now below the piston 322, this effectively blocks out the accumulator and this alone would cause the low band to be applied quickly. At the same time the accumulator valve stem 342 connects port 354 with the port 356 to supply oil at line pressure to the brake apply line through the additional orifice 358. Consequently now oil is being supplied to apply the brake through two orifices 328 and 358 in parallel and this further increases the rate of application of the low speed brake.

In addition to the foregoing, whenever the low brake is applied at high throttle, that is on forced down-shift or kickdown, the line pressure is increased, which provides a higher pressure at both orifices 328 and 358, which further increases the rate of application of the brake.

REVERSE INHIBITOR VALVE 108 (FIG. 3c)

This valve includes a casing having a bore in which is slidable a spool valve 370 urged to the left or open by a spring 372 and urged to the right or closed by governor pressure in a governor chamber 374. The valve is normally held open by the spring to connect the reverse supply line 208 to the reverse apply line 148 to establish reverse drive. But whenever the car is moving forward above some predetermined low speed, e.g. 5 m.p.h. the governor pressure in chamber 374 overcomes the spring 372 and holds the reverse inhibitor valve closed, which vents the reverse apply chamber 84 at exhaust port 376. Therefore while the range selector valve may be operated to pressurize the reverse supply line 208 at any time, the reverse brake will be held off until the forward car speed drops below the predetermined maximum for which the reverse should be applied. Whenever the reverse brake is applied, the line pressure of the pump is increased by the reverse boost chamber 146 in the main pressure regulating valve 92, as has been explained.

The reverse inhibitor valve 108 includes a hydraulic latch to prevent its being closed again after it has once opened to establish reverse drive, in the event that reverse car speed becomes greater than the inhibiting value. Since the governor may generate pressure in reverse, the inhibitor valve must be held open after reverse drive has been established. To accomplish this the reverse apply or RA line 148 is connected to a chamber at the right of the spool 370 so that once the reverse brake 84 has been applied, governor pressure in chamber 374 is opposed by superior line pressure at the right of the valve.

OPERATION AUTOMATIC OR $D_2$ DRIVE

The usual method of driving a car equipped with this transmission, except in long continued very hard going, is to drive in the automatic range. This is shown in FIGS. 3a, 3b and 3c and is designated $D_2$ as indicated by the position of the manual range selector valve 96 in FIG. 3b. In this range the car starts in low speed ratio in the gear set and shifts the gear set automatically between low and direct drive at the proper combination of car speed and throttle opening.

When the manual valve 96 is first placed in the $D_2$ position both the low supply line 216 and $D_2$ control line 214 are pressurized through groove 204. The shift valve 98 is in the downshifted position shown in FIG. 3c. In this position it blocks the pressurized $D_2$ control line 214 at ports 250 and 252. It vents the direct clutch supply line 220 through groove 258 to the $D_1$ control line 210, which is vented in the range selector valve 96 at exhaust port 212. Consequently the direct clutch 66 can not be engaged. The car is at a standstill and the throttle is closed or nearly closed so that the accumulator valve 104 will be in the position shown in FIG. 3a in which it supplies vacuum modulator pressure (at this time very low) through the accumulator feed line 325 to the space below the piston 322 in the accumulator 102. This vacuum modulator pressure is obtained from the accumulator valve line 256 which is connected by the shift valve 98 through its groove 254 to the vacuum modulator line 112. Accordingly there will be a low pressure below the piston in the accumulator 102 and oil will feed slowly from the low supply line 216 through the orifice 328 at the accumulator 102 (FIG. 3a) to the space above the piston 322 and to the low apply line 326 and begin to pressurize the low apply chamber 82. The pressure above the accumulator piston 322 will start to move the piston down against the spring 324 and the low pressure below the piston and the resulting expansion of the chamber above the piston will delay the building up of pressure in the low apply chamber 82. The pressure will slowly build up in the chamber 82 as the piston 322 moves down and increases the loading of the spring 324.

The rate at which the piston moves down is determined by the rate of flow through the orifice 328, which in turn is determined by the constant size of the orifice and by the difference in pressure between the line pressure in low supply pipe 216 and the space above the accumulator piston. The pressure in the space above the accumulator piston will be slightly greater than the sum of vacuum modulator pressure below the piston and the pressure effect of the spring 324 and the pressure effect of friction between the piston and the accumulator wall. Consequently the pressure required to move the piston down will be somewhat greater than the accumulator pressure. This will initially provide a certain rate of flow to the low servo 82, and as the spring loading 324 increases with stroking of the piston 322 the pressure above the piston will gradually increase. But the rate of increase will decrease with passage of time because the pressure differential across the orifice 328 will reduce the rate of flow into the low servo. This will provide a flat curve of gradually increasing pressure in the low servo 82 which will gradually and gently apply the low brake band 64 to establish initial driving torque at low speed ratio in the gear set.

As the car increases in speed, governor pressure increases in the shift valve 98 above the piston 236 and tends to up-shift the valve. Up-shift being opposed by limited vacuum modulator pressure, the car speed at which this up-shift occurs depends upon the throttle opening, as is known. Whenever the force of governor pressure, as an index of car speed, overcomes the force of throttle pressure or limited vacuum modulator pressure, as an index of throttle opening, the shift valve 98 will move to the up-shifted position shown in FIG. 4 and will be held there by the hydraulic latch effect described above. In this position the land above groove 254 closes the vacuum modulator line 112 and the groove 254 connects line pressure from the $D_2$ control line 214 at port 250 to the accumulator supply line 256, so that line pressure is supplied to the accumulator feed line 325. This balances hydraulic pressure on opposite sides of the accumulator piston 322 so that spring 324 returns the accumulator piston to the top position. Since the transmission is now to be shifted into high speed, the low brake release cylinder 83 is now to be pressurized and this will return the low brake apply piston to the bottom of the servo in position for the next application of the low speed brake. It is desirable that the accumulator piston be held up to block out the accumulator when this occurs.

When the low brake is released, oil must be displaced from brake apply chamber 82 by the spring 86. Such displacement must occur through orifices 328 and 358. If the up-shift occurs at low speed and throttle opening only orifice 328 will be open, but at higher speed or throttle opening both orifices will be open to permit quicker release of the brake. This provides proper timing of the release to effect up-shift under various speed and torque conditions.

In the shift valve 98 the land below groove 254 has moved down to close the $D_1$ control line 210 and to open the port 252 connecting the pressurized $D_2$ control line 214 to the direct clutch supply line 220 which now begins to pressurize the clutch apply cylinder 80 and the brake release cylinder 83 under the timing control of the clutch regulator valve 100. As soon as there is any pressure in clutch supply line 220, it closes a check valve 382 which would otherwise by-pass the regulator valve 100 to the clutch. As soon as there is any pressure in direct clutch apply line 306, it closes a check valve 380 connected between the clutch apply line 306 and the now vented $D_1$ control line 210. (These check valves must be closed before the clutch can be pressurized. They open to permit quick release of the clutch upon shifting from high to low or from high to neutral.) Pressure now builds up in the direct clutch apply cylinder and in the low servo release cylinder 83 under the timing control of the clutch regulator valve 100 in the manner explained above.

The timing of the release of the low brake is controlled both by the rate of increase of clutch pressure and the rate of flow of oil from the low brake apply chamber 82, because this chamber is pressurized whenever the car is being driven forward. Before the brake can be released the pressure in the cylinder 83 plus the pressure effect of the release spring 86 must exceed full line pressure in the chamber 82 and force oil out of this chamber through the choke 328 (and possibly also through choke 358) back into the main line 90. Consequently before the brake can be completely released the pressure in the direct clutch apply line 306 and the release chamber 83 must be at line pressure minus the force of the spring 86 and must have been at this value long enough to force sufficient oil from the chamber 82 through the orifice 328 to release the brake band 64. However if the up-shift is made at high speed or high throttle opening the governor pressure in chamber 348 of the accumulator valve 104 and/or vacuum modulator pressure in chamber 346 will move the valve up and open the orifice 358 between the low apply line 326 and the low supply line 216, providing an additional path for release of oil from the low apply chamber 82 and permitting quicker release of the low brake. This arrangement provides for the proper timing of the release of torque in the low speed drive and the establishment of torque in the high speed or direct drive.

In up-shifting in transmissions of this character it is desirable to have a certain amount of torque overlap. That is the low speed brake continues to apply decreasing torque while increasing torque is being applied by the direct drive clutch, until the brake torque is completely eliminated and the drive clutch has full torque capacity established by line pressure. This makes a smooth transition from low speed drive to high speed drive under various conditions of speed and throttle opening.

Figure 7:
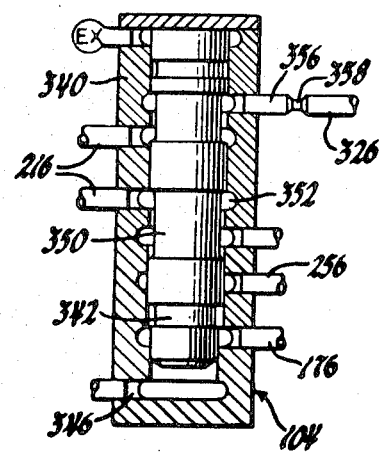
FIG. 7 shows the accumulator valve of FIG. 3a moved by relatively high car speed or relatively high torque demand to block out the low accumulator and accelerate setting of the low speed brake band.

Drive continues with the gear set in direct drive until either the car speed drops to a predetermined low value, for example on coasting down to a stop, or until there is a forced down-shift or kick-down by operating the kick-down valve in the stator control valve, as has been explained. When the down-shift occurs the direct clutch supply line 220 is vented through the shift valve 98 by groove 258 which connects the direct clutch line to the $D_1$ control line 210 which is vented in the range selector valve at exhaust port 212. This permits rapid venting of the clutch apply line 306 through the check valve 382. The direct clutch is quickly released. On any coast down-shift it is desirable to have a torque-free interval between the release of the direct drive clutch and the establishment of torque in the low speed brake, as is known, in order to allow the engine to increase its speed from the speed required to drive the output shaft through the direct drive clutch to the higher speed required to drive the output shaft at the same speed through the low speed gear. When a coast down-shift occurs as has just been described the vacuum modulator pressure is restored to the bottom of the accumulator 102 by connecting the vacuum modulator line 112 to the accumulator supply line 256 through the shift valve 98 at groove 254. Both the vacuum modulator pressure and governor pressure are low. The throttle is closed or nearly closed and the car has coasted down to a speed permitting the spring 344 to hold the accumulator valve 104 in the position shown in FIG. 3a. Consequently the accumulator 102 is up and may stroke and the orifice 358 is closed. This will apply the low band slowly to provide a gentle down-shift. On a forced down-shift the vacuum modulator pressure will be high because the throttle is necessarily wide open in order to operate the detent valve in the stator valve 110. This moves the accumulator valve 104 up to the position shown in FIG. 7 in which line pressure is restored below the piston 322 of the accumulator and the low apply orifice 358 is open. This establishes the fastest rate at which the low band can be applied. This gives the engine time to pick up the required speed to drive the output shaft through the low speed gearing but prevents run away of the engine.

LOW RANGE DRIVE

To drive the car in low range the range selector valve 96 is moved one position to the right of that shown in FIG. 3b. In this position the $D_2$ control line 214 is cut off from supply from the main line 90 and is vented at the port 212. Consequently no pressure can be supplied to the shift valve, which thus remains inactive, and no oil can be supplied to the direct clutch apply line 306. Oil is supplied to the low clutch supply line 216 which applies the low brake under the timing control of the low accumulator 102 and the accumulator valve 104 as has been explained. Usually when in low range the low drive will be established in what is called the garage shift, that is, with the car stationary. At this time governor pressure is zero and vacuum modulator pressure is low so that the accumulator valve is in the position shown in FIG. 3a. . This will provide a gentle or slow application of the low speed brake as has been explained. It is possible however to apply the low speed drive while the car is moving by moving the manual valve. This may effect a down-shift from direct drive. When this occurs the direct clutch is vented through the up-shifted shift valve 98 which is in the position of FIG. 4 and connects the direct clutch supply line 220 with the D₂ control line 214 at port 252, but the D₂ control line is now vented by the manual valve at 212. This quickly releases the clutch as has been explained through the check valve 382. In such manual down-shift (as distinguished from kick-down by operation of the shift valve 98 from the detent valve in the stator control valve 110) the low band is applied quickly or slowly according to speed and torque demand conditions by the accumulator 102 and accumulator valve 104 as has been explained.

DRIVE-1 OR HIGH SPEED DRIVE ALONE

This drive through the direct clutch alone is accomplished by moving the range selector valve one position to the left of that shown in FIG. 3b namely with the index opposite with the D₁ mark. This pressurizes the D₁ control line 210 which as shown in FIG. 3b is connected directly to the clutch apply line 306 through the check valve 380 which now opens to pressurize the clutch apply line 306, by-passing the shift valve. The pressure in the clutch apply line 306 and its rate of build-up are controlled by the clutch regulator valve 100 as has been explained. Since the direct clutch is thus pressurized the low brake release cylinder 83 holds off the low brake which cannot in these circumstances be applied. The drive-2 control line 214 which otherwise permits the establishment of low drive under certain conditions is pressurized by the range selector valve but this has no effect because the shift valve is by-passed by the connection from line 214 to the clutch apply line 306. Consequently as long as the range selector valve is in the D₁ position the direct drive clutch will be applied and the low brake will be held released.

I claim:
1. A transmission comprising in combination input means; output means; a torque establishing device for operatively connecting the input and output means including fluid pressure chamber means for engaging the torque establishing device; fluid source means for supplying fluid pressure; supply passage means in fluid communication with said source means; restricted apply passage means in fluid communication with said chamber means; a third and restricted passage means in fluid communication with said restricted apply passage, the effective cross-sectional area of said third and restricted passage means being less than the effective cross-sectional area of said apply passage; and valve means operatively connected between said supply passage and said apply passage for conducting fluid between the passages including a first portion responsive to fluid pressure between the valve and restricted apply passage means for closing said valve means and restricting flow between said supply passage and said apply passage and a second portion responsive to fluid pressure in said third passage for opening said valve means.

2. A transmission comprising in combination input means; output means; a torque establishing device for operatively connecting the input and output means including a fluid pressure apply chamber for engaging the torque establishing device; fluid pressure source means for supplying fluid pressure; supply passage means in fluid communication with said source means; apply passage means in fluid communication with said apply chamber having a restriction therein; a restricted passage connected with said apply passage; and valve means operatively connected between said supply and apply passages for conducting fluid therebetween including a pressure responsive portion responsive to fluid pressure between the valve means and the restriction for closing said valve means and restricting flow from the supply passage, and an expansible chamber portion in fluid communication with said restricted passage and being expansible in response to fluid pressure in said apply passage for delaying the increase of pressure in said apply chamber.

3. A transmission comprising in combination input means; output means; a torque establishing device for operatively connecting the input and output means including a fluid pressure apply chamber for engaging the torque establishing device; fluid pressure source means for supplying fluid pressure; supply passage means in fluid communication with said source means; restricted apply passage means in fluid communication with said apply chamber having a restriction therein; a restricted passage connected with said apply passage, the effective cross-sectional area of said restricted passage being less than the effective cross-sectional area of said apply passage; and valve means operatively connected between said supply and apply passages for conducting fluid therebetween including a pressure responsive portion responsive to fluid pressure between the valve means and the restriction for closing said valve means and restricting flow from the supply passage and an expansible chamber portion in fluid communication with said restricted passage and being expansible in response to fluid pressure in said apply passage for delaying the increase of pressure in said apply chamber.